United States Patent Office 3,560,619
Patented Feb. 2, 1971

3,560,619
AMINOQUINAZOLINES AND QUINAZOLONES IN TREATMENT OF COCCIDIOSIS
Edward F. Harrison and Aubrey A. Larsen, Evansville, Ind., assignors to Mead Johnson & Company, a corporation of Delaware
No Drawing. Filed Jan. 3, 1967, Ser. No. 606,552
Int. Cl. A61k 27/00
U.S. Cl. 424—251   10 Claims

ABSTRACT OF THE DISCLOSURE

Administration to poultry of 6-halo-4-aminoquinazolines and 6-halo-4-quinazolones and their 2-methoxy analogs to combat *Eimeria tenella* infections.

---

This invention relates to combatting coccidiosis in poultry by means of the oral administration of compounds of Formulas I and II and the nontoxic acid addition salts thereof. Administration of such compound in admixture with the feed is a preferred means of practicing the invention. Feed compositions containing these substances are described as part of the invention.

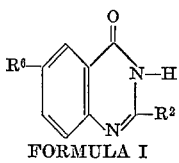  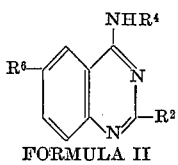

FORMULA I         FORMULA II

In the foregoing structural formulas, $R^2$ is hydrogen or methoxy; $R^4$ is hydrogen, methyl, or ethyl; and $R^6$ is chlorine, bromine, or iodine. When reference is made to the nontoxic acid addition salts of these substances, what is meant is those salts in which the anion does not contribute significantly to the toxicity of the compound in the doses in which it is used in accordance with the following dsclosure.

Current practice in poultry raising involves the feeding of coccidiostatic preparations in the general diet as a prophylactic measure. Those substances which are used as prophylactic agents in the diet are in fact capable of effecting cures in infected birds, but desirably from the economic standpoint, prevention is more important and it has been found in practice that those compounds capable of curing infections will essentially eradicate the disease from the flock and maintain this condition when fed in prophylactic diets. Coccidiosis is a disease affecting primarily poultry which is caused by protozoa of the genus Eimeria. It is a particularly serious economic problem with reference to the raising of chicks, including both broilers and laying hens. While the disease is frequently fatal, its effect is perhaps more serious from an economic standpoint in that it reduces the growth rate of poultry with a consequent increase in feed consumption in order to achieve suitable poultry weight.

A number of organic and inorganic compounds have been used for the treatment of coccidiosis. These include sulfaquinoxaline, 3,5-dinitrobenzamide, 3,5-dinitrotoluamide, tetraethylthiuramidisulfide, 1-(4-amino-2-n-propyl-5-pyrimidylmethyl)-2-methylpicolinium chloride (amprolium), and 5-nitro-2-furaldehydesemicarbizone. None of these substances has been found to be completely satisfactory from all standpoints. One reason for this is that different circumstances impose different requirements. For example, an anti-coccidial agent for broilers should completely eradicate the infection and have no effect whatever on weight gain or food consumption. On the other hand, with pullets it is desirable that the agent allow development of sufficient infection to produce an immunity against later exposures when the birds are transferred to the layer flock. This may result in some impairment of weight gain which is not critical. Requirements not completely satisfied by prior art coccidiostats include low price, palatability, stability, effectiveness, and physical properties permitting ready blending with the feed.

The oral administration of a nontoxic daily dose of from about 0.5 milligram to 5.0 milligrams of one or a combination of substances of Formulas I and II to poultry and particularly chicks of from 1 to 3 weeks of age constitutes an important aspect of the present invention. Any convenient means of oral administration can be employed such as by incorporation in the drinking water or the feed, or by means of a syringe and canula. The preferred method of administration in accordance with the present invention and in the industry generally at this time is by means of a feed composition. Conventional poultry feeds containing from about 0.005 to 0.05% by weight of one or more of the substances of Formulas I and II are employed.

The dosage employed must in any event be a nontoxic dose. When employing the direct administration with a syringe and canula, the toxic dose can be ascertained in a preliminary experiment involving the administration of various doses to small groups of chicks. With feed compositions toxicity or lack of palatability is not generally reflected by deaths but by weight gain of the chicks. The dosage range and feed composition concentration range specified above includes the generally operable limits for the class of compounds, but in each instance it is intended that a nontoxic dose be selected for use.

The effectiveness of treating poultry for control of a coccidial infection according to the present invention is illustrated by the following.

EXAMPLE 1

Treatment by oral intubation

Eight day old New Hampshire Red chicks each weighing 60 to 70 grams are divided into groups of five each. All groups are fed a conventional chick mash designed for rapid growth and water ad libitum. Two groups of chicks are not medicated and serve as control groups, one infected and one not infected. The test drug is administered directly into the crop of each chick of the medicated groups. Each test drug is administered to three groups of chicks at different doses. The dose is contained in a volume of 0.5 milliliter of water administered through a rubber canula attached to a syringe. The chicks are weighed at the outset and at the conclusion of the experiment, which lasts eight days. The drug is administered in the morning on each of the first five days. In the afternoon of the second day the chicks which are to be infected are treated orally with 50,000 sporulated oocysts of *Eimeria tenella* using a rubber canula and syringe. The oocysts are prepared by the method of Gardiner and McLoughlin, J. Parisitol. 46, 732 (1960). The concentration of sporulated oocysts in the suspension is determined by counting in a hemocytometer. The chicks are held until the eighth day of the experiment when they are weighed, sacrificed, and examined for evidence of infection. The drug effectiveness is judged by mortality, achievement of satisfactory weight gain, and by an evaluation of the degree of pathological involvement. A four-point scale is used to grade the degree of pathological involvement at necropsy according to the following scheme: 0=no lesions in the cecum; 1=slight lesions; 2=moderate lesions; 3=severe lesions without hemorrhage; 4=severe lesions with swelling and hemorrhage; 5=death due to infection. The resulting score is referred to as the pathological index. The anticoccidial index $(ACI_{50})$ is then calculated from a dose response curve using the foregoing scores calculated for each of the three dose levels. This term is defined as the daily dose of drug expressed in milligrams which, when administered to chicks according to the foregoing test, will decrease the pathological index by 50%. The infected control group normally scores 4.0 for pathological index.

For comparison purposes a known anticoccidial agent, amprolium, 1-(4-amino-2-n-propyl-5-pyrimidinylmethyl)-2-picolinium chloride hydrochloride, was included in the foregoing test. The test results obtained by the above procedure are given in Table I.

TABLE I.—ANTICOCCIDIAL INDEX

| Compound | Dose | Pathologic index | ACI₅₀ |
|---|---|---|---|
| 6-bromo-4-methylaminoquinazoline hydrochloride | 1.0<br>0.5<br>0.25 | 0.0<br>2.2<br>4.0 | 0. |
| 6-bromo-4-quinazolone | 1.0<br>0.5<br>0.2<br>0.1 | 0.0<br>0.0<br>2.8<br>3.6 | 0.25 |
| 6-chloro-4-methylaminoquinazoline | 5.0<br>2.0<br>1.0<br>0.5 | 0.0<br>0.0<br>0.1<br>1.5 | 0.34 |
| 6-iodo-4-quinazolone | 1.0<br>0.5<br>0.25 | 0.8<br>1.4<br>2.8 | 0.39 |
| 6-chloro-4-quinazolone | 5.0<br>1.0 | 0.0<br>1.4 | 0.6 |
| 6-bromo-4-ethylaminoquinazoline | 5.0<br>1.0<br>0.5 | 0.0<br>0.4<br>3.2 | 1.4 |
| 4-amino-6-chloro-2-methoxyquinazoline | 4.0<br>2.0<br>1.0<br>0.5 | 0.0<br>0.0<br>0.9<br>3.1 | 0.78 |
| 4-amino-6-bromoquinazoline | 5.0<br>1.0<br>0.2 | 0.3<br>2.1<br>4.0 | 1.2 |
| Amprolium | 5.0<br>2.0<br>1.0 | 0.0<br>1.4<br>2.4 | 1.3 |

EXAMPLE 2

Feed compositions

Feed compositions providing various concentrations in the ration of the compounds listed in Table I are prepared according to the following schedule. The amount of drug listed in the first column is the amount which is blended with sufficient of a chick growth mash to provide a kilogram of the feed composition. The percentage of drug in the feed is expressed in the last column.

Drug, amt. mg./kg.: Percent
500 _____ 0.05
250 _____ 0.025
125 _____ 0.0125
62.5 _____ 0.00625

EXAMPLE 3

Feeding experiment

Three week old New Hampshire Red chicks weighing approximately 220 grams were housed in wire-floored battery brooders and allowed food and water ad libitum. Each chick was marked and weighed at the outset of the experiment, and on each day during the experiment. Each feed composition was administered to two groups of 10 chicks. In addition, two groups of 10 chicks received the same ration to which no medication had been added to serve as non-medicated controls, one infected and one non-infected. One group of each of the paired groups of chicks receiving the medicated ration and one of the non-medicated control groups was infected on the second day of the experiment with 200,000 sporulated oocysts of *Eimeria tenella* by depositing a suspension thereof, prepared and counted as before, in the crop with a rubber canula attached to a syringe. To serve as a positive therapeutic control, feed compositions containing amprolium at various concentrations are also tested according to this protocol.

At termination of the experiment, the daily average chick weight and the gain or loss in weight for each test group was calculated. A usual weight gain for the control group of healthy chicks receiving the nonmedicated ration was about 140 grams during the 9 day experiment. The average pathological index for each group was determined after autopsy. The following results were obtained:

(a) A feed composition containing 0.0125% of 6-chloro-4-methylaminoquinazoline was evaluated according to the foregoing protocol. At termination of the experimental period, it was found that the average weight gain per infected chick receiving this medicated feed was 107.7 g. All chicks medicated in this fashion survived the experiment and were completely cleared of the infection (pathologic index 0).

(b) A feed composition containing 0.0125% of 6-bromo-4-methylaminoquinazoline was evaluated in the foregoing manner with the finding that all chicks survived the experiment and that 6 of the 10 infected were completely cured of the infection. The average pathologic index for the group was 0.9. The average weight gain per chick was 104.5 g.

(c) A feed composition containing 0.05% of 4-amino-6-chloro-2-methoxyquinazoline was evaluated according to the foregoing protocol. The average weight gain per infected chick was 88.7 g. All chicks survived the experimental period and 7 of the 10 were completely cleared of infection. The average pathologic index for the group was 0.95.

(d) A feed composition of the character described in Example 2 containing 0.00625% of 6-iodo-4-quinazolone was prepared and evaluated according to the foregoing protocol. All chicks survived the experiment period and it was found that 7 of the 10 were cleared of infection. The average pathologic index for the group was 0.65, and the average weight gain per chick was 53.7 g.

The compounds with which the present invention is concerned are members of a well-known class of compounds, and general methods for their synthesis are known. Nevertheless, a number of the specific substances which have been found to be highly active coccidiostats are new compounds, and procedures for their preparation are given in the following paragraphs. The 6-halo-4-quinazolones referred to in the foregoing description of the invention have been described in the literature. Refer to D. R. Baker et al., J. Org. Chem. 17, 141 (1952) for the preparation of 6-chloro-4-quinazolone and 6-bromo-4-quinazolone by fusion of 5-chloro and 5-bromoanthranilic acid with dormamide. The preparation of 6-iodo-4-quinazolone is described by Subbaram, J. Madras University 24b, 183–7 (1954).

PROCEDURE 1

6-bromo-4-quinazoline 9-bromo-4-quinazolone, 11.2 grams (0.05 mole), 60 milliliters of phosphorus oxychloride, and 13 milliliters of tri-n-propylamine are refluxed for 40 minutes employing a flask equipped with a reflux condenser and fitted for maintenance of a nitrogen atmosphere. The condenser is then arranged for distillation and excess phosphorus oxychloride is removed by distillation in vacuo. The residue is extracted with 350 milliliters of 4:1 heptane-benzene containing 9 milliliters of tri-n-propylamine. An additional 400 milliliters of benzene is added to solubilize the yellow solid and the solvent solution is then washed in sequence with aqueous 20% sodium hydroxide and with water, to remove acidic materials. After drying the extract over magnesium sulfate, the solvent is evaporated, yielding the crude product which is recrystallized from isopropyl acetate and then from cyclohexane; yield, 7.5 grams (61%), melting point 162–165° C.

PROCEDURE 2

6-bromo-4-methylaminoquinazoline

A solution prepared from 700 milliliters of absolute ethanol and sufficient monomethylamine to provide an apparent pH of 9.0 is prepared and 7.5 grams (0.031 mole) of 6-bromo-4-chloroquinazoline is added to the solution. Additional monomethylamine is introduced through a gas delivery tube until the quinazoline completely dissolves and the resulting solution has apparent pH 9.0. Care should be taken during the course of the reaction to assure that an acidic pH does not prevail. The alcohol solution is kept for 2 days at room temperature and the solvent is then distilled in vacuo. The residue is triturated with water to remove by-product methylamine hydrochloride, and the residue recrystallized from ethanol; yield, 4.5 grams (60%), melting point 258–260° C.

PROCEDURE 3

6-bromo-4-methylaminoquinazoline hydrochloride 6-bromo-4-methylaminoquinazoline, 2-grams, is dissolved in 50 milliliters of 10% ethanolic hydrogen chloride. An insoluble product forms which is dissolved by warming and treatment with approximately 50 milliliters of water. The clear solution is then chilled, resulting in crystallization of the desired product; yield, 2.6 grams, melting point 281–285° C.

PROCEDURE 4

6-bromo-4-ethylaminoquinazoline

A solution of 9 milliliters of ethylamine in 250 milliliters of absolute ethanol is prepared and 7.5 grams (0.03 mole) of 6-bromo-4-chloroquinazoline is added thereto. A clear solution forms after stirring and is kept for 1 day at room temperature. The solvent is then distilled in vacuo, the residue triturated with water, and then dissolved in 120 milliliters of hot ethanol. Insoluble material is removed by filtration and the filtrate is diluted with 150 milliliters of water. The product crystallizes when the solution is chilled. It is collected and again crystallized from aqueous ethanol; yield, 5.5 grams, melting point 188–190° C.

PROCEDURE 5

6-chloro-4-methylaminoquinazoline

Procedure 2 is adapted to the preparation of this compound by substitution of 4,6-dichloroquinazoline for 6-bromo-4-chloroquinazoline. The starting material is prepared by the method of Sherril et al., J. Org. Chem. 19, 699–710 (1954). From 12.0 grams (0.06 mole) of 4,6-dichloroquinazoline there is obtained 8.0 grams (69%) of 6-chloro-4-methylaminoquinazoline, melting point 254–6° C.

PROCEDURE 6

4-amino-6-chloro-2-methoxyquinazoline 6-chloro-2,4-dimethoxyquinazoline, 10 grams, is heated at 100° C. for 48 hours in a pressure vessel with a saturated solution of a multimolecular excess of ammonia in methanol. The contents of the vessel are then concentrated to dryness and the solid residue is washed with ether and hot isopropyl acetate. It is recrystallized from methanol; yield, 5.6 grams (60%), melting point 245–250° C. The starting material is prepared from 2,4,6-trichloroquinazoline (Curd et al., J. Chem. Soc. 1762 (1948)) by refluxing with methanolic sodium methoxide.

PROCEDURE 7

4-amino-6-bromoquinazoline

A solution of 10 grams of ammonia in about 50 milliliters of ethanol is prepared and 7.0 grams (0.029 mole) of 6-bromo-4-chloroquinazoline is added. The mixture is heated on a steam bath to dissolve the material, and almost immediately after solution is complete a precipitate forms. The precipitate is a hydrochloride salt of 4-amino-6-bromoquinazoline. It is collected, washed with water, dissolved in 95% aqueous ethanol, and 4-amino-6-bromoquinazoline precipitated from the solution as the base by treatment with aqueous sodium hydroxide. The precipitated base is collected, washed with water and then with methanol, yielding the pure product, melting point about 330° C. (dec.).

Other nontoxic acid addition salts may be prepared substantially as described in Procedure 3, employing various acids such as hydrobromic, hydroiodic, acetic, propionic, benzoic, phosphoric, nitric, succinic, gluconic, mucic, sulfuric, methanesulfonic, ethanesulfonic, p-toluenesulfonic, citric, tartaric, pamoic, and tannic acids, and by selection of suitable solvents for reaction and crystallization.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A feed composition comprised of a foodstuff for poultry containing from 0.005% to 0.05% by weight of a compound wherein the formula is:

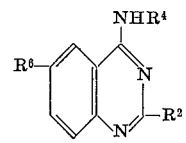

wherein $R^2$ is hydrogen or methoxy, $R^4$ is hydrogen, methyl, or ethyl, and $R^6$ is chlorine, bromine, or iodine, or a nontoxic acid addition salt thereof.

2. The feed composition of claim 1 wherein said compound is 6-chloro-4-methylaminoquinazoline.

3. The feed composition of claim 1 wherein said compound is 6-bromo-4-methylaminoquinazoline.

4. The composition of claim 1 wherein said compound is 4-amino-6-chloro-2-methoxyquinazoline.

5. The proces of treating poultry for coccidial infection which comprises the oral administration of a nontoxic dose of from 0.5 to 5 milligrams per day of a compound wherein the formula is

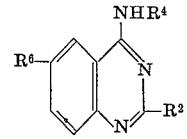

wherein $R^2$ is hydrogen or methoxy, $R^4$ is hydrogen methyl, or ethyl, and $R^6$ is chlorine, bromine, or iodine, or a nontoxic acid addition salt thereof.

6. The process of claim 5 wherein 6-chloro-4-methylaminoquinazoline is employed.

7. The process of claim 5 wherein 6-bromo-4-methylaminoquinazoline is employed.

8. The process of claim 5 wherein 4-amino-6-chloro-2-methoxyquinazoline is employed.

9. The process of treating poultry for coccidial infection which comprises the oral administration of a nontoxic dose of from 0.5 to 5 milligrams per day of a compound wherein the formula is

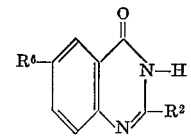

or

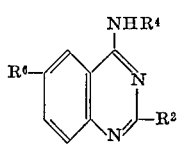

wherein R² is hydrogen or methoxy, R⁴ is hydrogen, methyl, or ethyl, and R⁶ is chlorine, bromine, or iodine, or a nontoxic acid addition salt thereof.

10. The process of claim 9 wherein 6-iodo-4-quinazolone is employed.

References Cited
UNITED STATES PATENTS

| 3,047,462 | 7/1962 | Maillard et al. | 167—65 |
| 3,184,462 | 5/1965 | Scarborough et al. | 260—256.4 |
| 3,320,124 | 5/1967 | Waletzky et al. | 167—53 |
| 3,324,122 | 6/1967 | Burch | 260—247.5 |

FOREIGN PATENTS

| 1,107,234 | 5/1961 | Germany | 128—10 |

OTHER REFERENCES

Chem. Abstracts, vol. 50, Sec. 352(E), 1956.

SAM ROSEN, Primary Examiner

U.S. Cl. X.R.
260—251